United States Patent

[11] 3,600,508

[72] Inventors Albert H. Dann
Mountain View;
Robert L. Davis, San Jose; Eugene R. P. Leman, Los Gatos, all of, Calif.
[21] Appl. No. 839,190
[22] Filed July 7, 1969
[45] Patented Aug. 17, 1971
[73] Assignee International Video Corporation
Sunnyvale, Calif.

[54] VIDEO TAPE RECORDER WITH EDITING FEATURE AND IMPROVED TAPE SPEED CONTROL
17 Claims, 6 Drawing Figs.

[52] U.S. Cl. .......... 178/6.6 A, 178/6.6 P, 179/100.2 B, 318/314
[51] Int. Cl. .......... G11b 15/28, G11b 19/28, G11b 27/28
[50] Field of Search .......... 179/100.2 B, 100.2 S; 178/6.6 A, 6.6 P; 318/314 X

[56] References Cited

UNITED STATES PATENTS

| | | | |
|---|---|---|---|
| 3,016,428 | 1/1962 | Kabell et al. .......... | 179/100.2 |
| 3,017,462 | 1/1962 | Clark et al. .......... | 178/6.6 |

*Primary Examiner*—Bernard Konick
*Assistant Examiner*—Steven B. Pokotilow
*Attorney*—Limbach, Limbach and Sutton

ABSTRACT: A video tape recorder having a servocontrol of the video head drive and another servocontrol of the capstan tape drive is described. In record, the capstan tape drive is controlled by tachometer pulses from the video head drive and during playback the capstan tape drive is switched over to control by control pulses from the magnetic tape. The tachometer pulses and the control track pulses are multiplied by a substantial amount to reduce the degree that they may be out-of-phase with each other to thereby reduce the effect on capstan speed when switching from control by the control pulses to control by the tachometer.

INVENTORS
ALBERT H. DANN
ROBERT L. DAVIS
EUGENE R.P. LEMAN
BY Limbach and Limbach
ATTORNEYS INVENTORS
ALBERT H. DANN
ROBERT L. DAVIS
EUGENE R.P. LEMAN
BY Limbach and Limbach
ATTORNEYS INVENTORS
ALBERT H. DANN
ROBERT L. DAVIS
EUGENE R. P. LEMAN
BY Limbach and Limbach
ATTORNEYS INVENTORS
ALBERT H. DANN
ROBERT L. DAVIS
EUGENE R.P. LEMAN
BY Limbach and Limbach
ATTORNEYS

VIDEO TAPE RECORDER WITH EDITING FEATURE AND IMPROVED TAPE SPEED CONTROL

The present invention relates in general to video tape recorders and more particularly to a video tape recorder designed to provide an editing feature.

The standard modes of operation of a video tape recorder include the record mode where a video signal from an outside source such as a video camera or another recorder is recorded on a magnetic tape, generally in combination with an accompanying audio signal. The playback mode of operation of the video recorder permits the video and audio signal replay of material which has been recorded on a magnetic tape.

The editing feature is provided in a video recorder where it is desirable to add new material, both video and audio, to the video and audio material already contained on a magnetic tape. In this instance the video recorder is operated in the playback mode to reproduce the material already recorded on the magnetic tape while at the same time the new video material from the outside source is monitored in order to determine the exact instance when the new material to be added to the recorded existing material is in synchronism therewith. When the recorded material and new material are properly synchronized and the point reached where the new material is to be added, the video recorder is switched from the playback mode to the record mode, at which time the new material is added directly following the previously recorded material.

In existing helical scan video recorders, the video recording head which records the video track on the moving magnetic tape is controlled by a servo loop so as to be synchronized with the vertical sync pulse of the incoming video signal such that the vertical sync signal will be accurately recorded on the edge of the tape at the crossover point of the tape loop. In addition to recording the video track on the magnetic tape, a series of spaced-apart control track pulses are recorded in a control track on the tape, these control track pulses being produced by a tachometer generator coupled to the video-recording head. The control track pulses are thus also synchronized with the vertical sync pulses. The capstan drive, which serves to drive the magnetic tape in relation to the video-recording head, is controlled during the record mode by a tachometer coupled to the rotating video head. The magnetic tape speed is thereby synchronized with the rotating video head and thus with the incoming vertical sync pulses.

During the playback mode of operation, the video head servo loop is controlled by the vertical sync pulses of an external video source, or in the absence thereof from the 60-cycle frequency of the line voltage. The control of the capstan tape drive is switched from control by the tachometer generator of the rotating video head to control by a servo loop including the recorded control pulses from the video tape. The speed of the capstan drive is regulated by the control track pulses so that the video head will be aligned with the spaced-apart video tracks recorded on the magnetic tape.

In a system of this type where the control of the magnetic tape drive is transferred from the control track pulses of the video tape to the tachometer generator of the video head during the editing period, the tape drive motor may encounter a tachometer pulse which is up to 180° out-of-phase with the control track pulses. The tape drive motor, in attempting to lock in phase with the tachometer pulses, will react with a momentary shift in speed. This momentary change in the speed of the magnetic tape at the switch over from playback mode to record mode results in a disturbance in the reproduction of a black and white video signal and a disruption of the color lock system of a video recorder.

In the present invention a novel method and apparatus is utilized to reduce the maximum possible degree that the tachometer pulses may be out-of-phase with the control track pulses from 180°, as in the old system, to some lesser degree, e.g. less than 1°, to thereby eliminate disturbance in the reproduction of the black and white or color video signal.

In this system, the tachometer pulses, which serve to control the tape drive speed during the record mode, are multiplied by a substantial amount, for example, by a factor of 256. The tape drive circuit locks on one of these pulses in each series. Each pulse from the video tape control track is also multiplied by the same substantial factor so that the magnetic tape drive, when switched from the recording head tachometer generator to the control track pulses, will have 256 pulses to lock to rather than seeking to lock in on a single pulse for each revolution of the video recorder head. The phase shift to accomplish this lock in, rather than ranging up to 180° as with the single pulse, will be reduced to less than 1.0° with the multiple pulse arrangement.

In another embodiment of the invention, control of the capstan tape drive during the record mode of operation is provided from the vertical sync pulses of the incoming video signal, rather than by a tachometer generator from the video head. The vertical sync signal is utilized to control the frequency of a voltage-controlled oscillator designed to produce the multiple frequency of the control pulses, i.e. 256 pulses for each single cycle of the video head. These and other aspects of the present invention will become apparent from a perusal of the following specification taken in connection with the accompanying drawings wherein:

Figure 1:
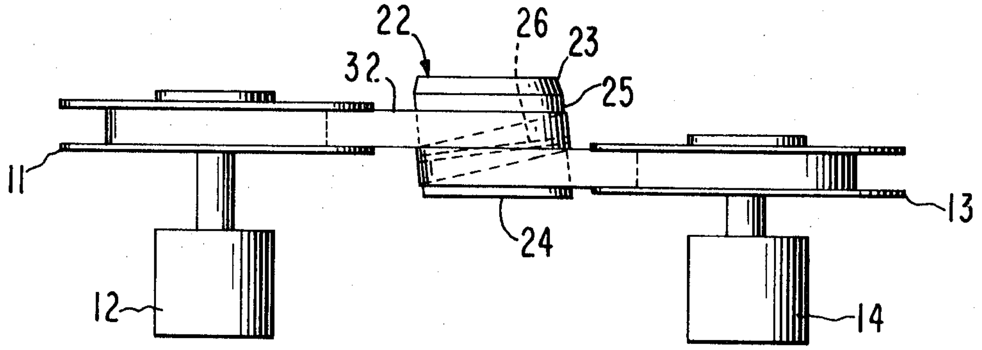
FIG. 1 is a plan view of the tape transport arrangement of a typical helical scan video tape recorder utilizing the present invention.
Figure 2:
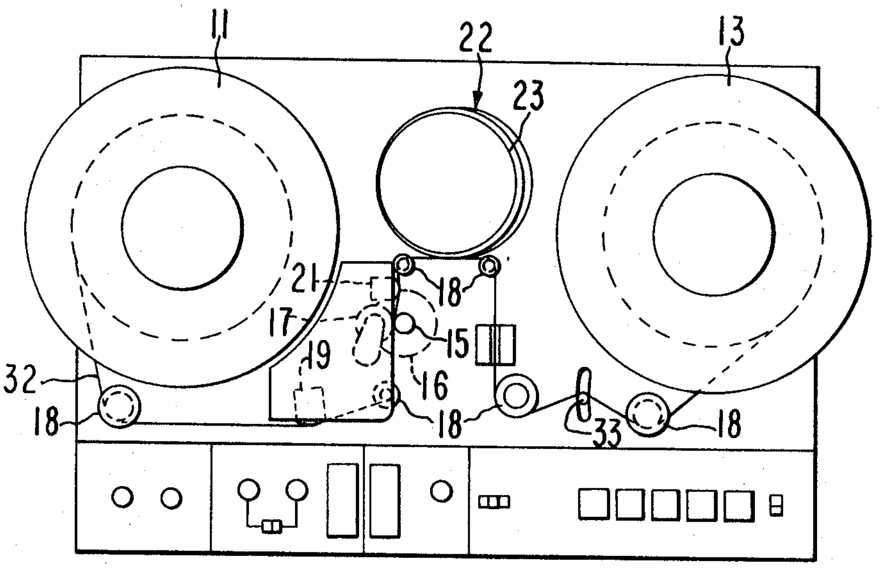
FIG. 2 is a top view of the tape transport apparatus of FIG. 1.
Figure 3:
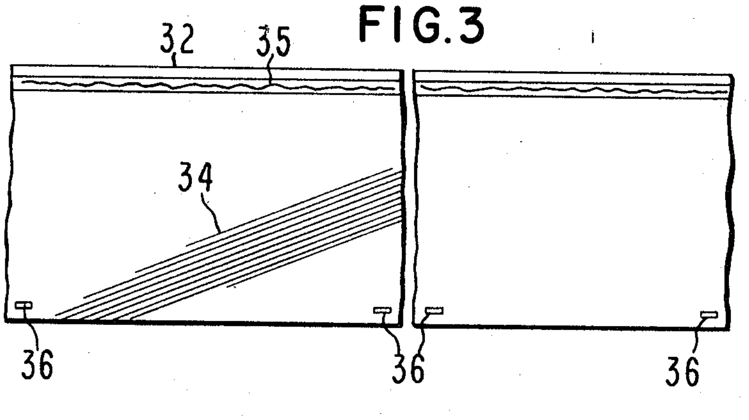
FIG. 3 is a schematic representation of the video tape showing the arrangement of the slanted video tracks and the control track.
Figure 4:
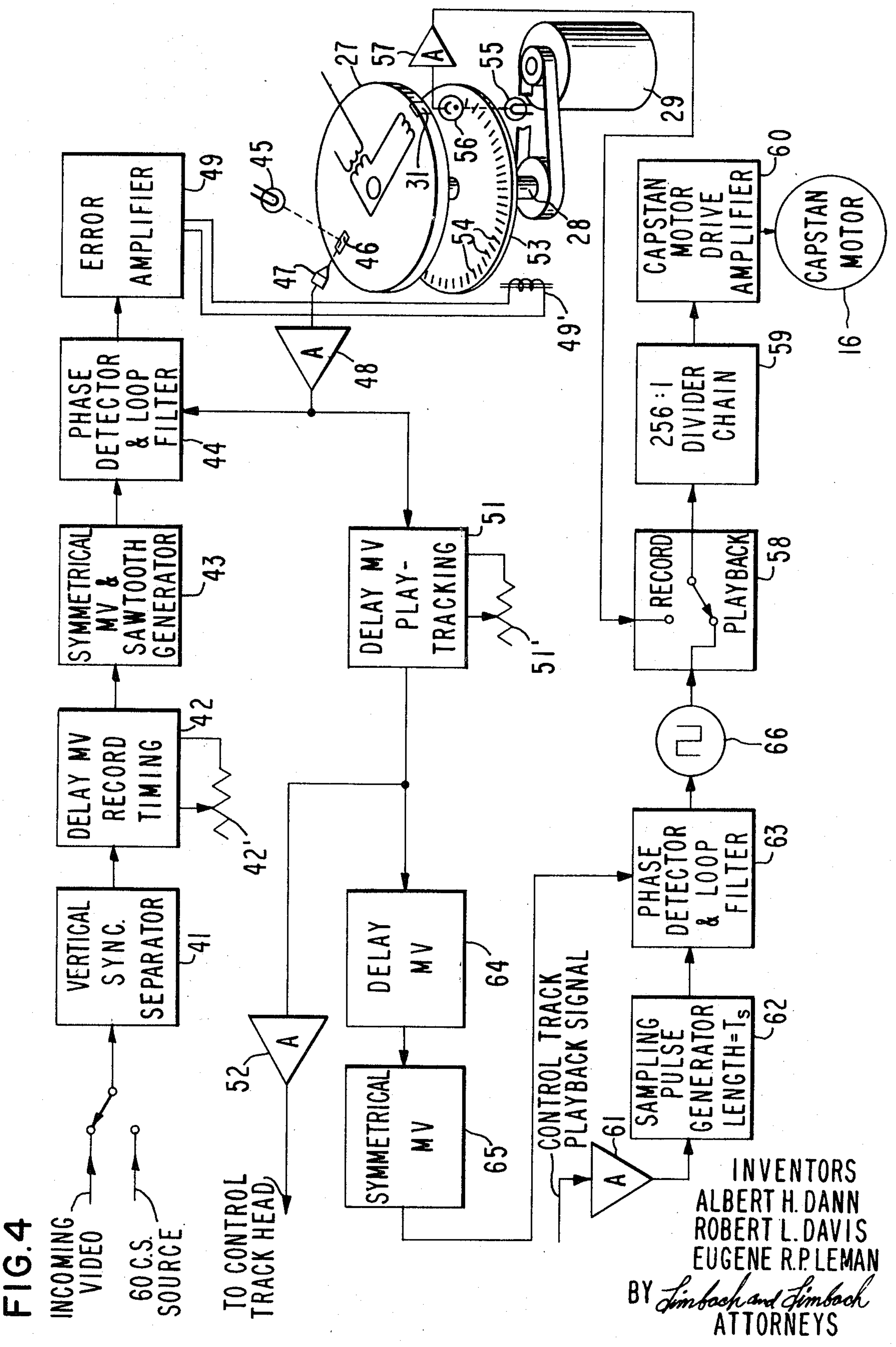
Figure 5:
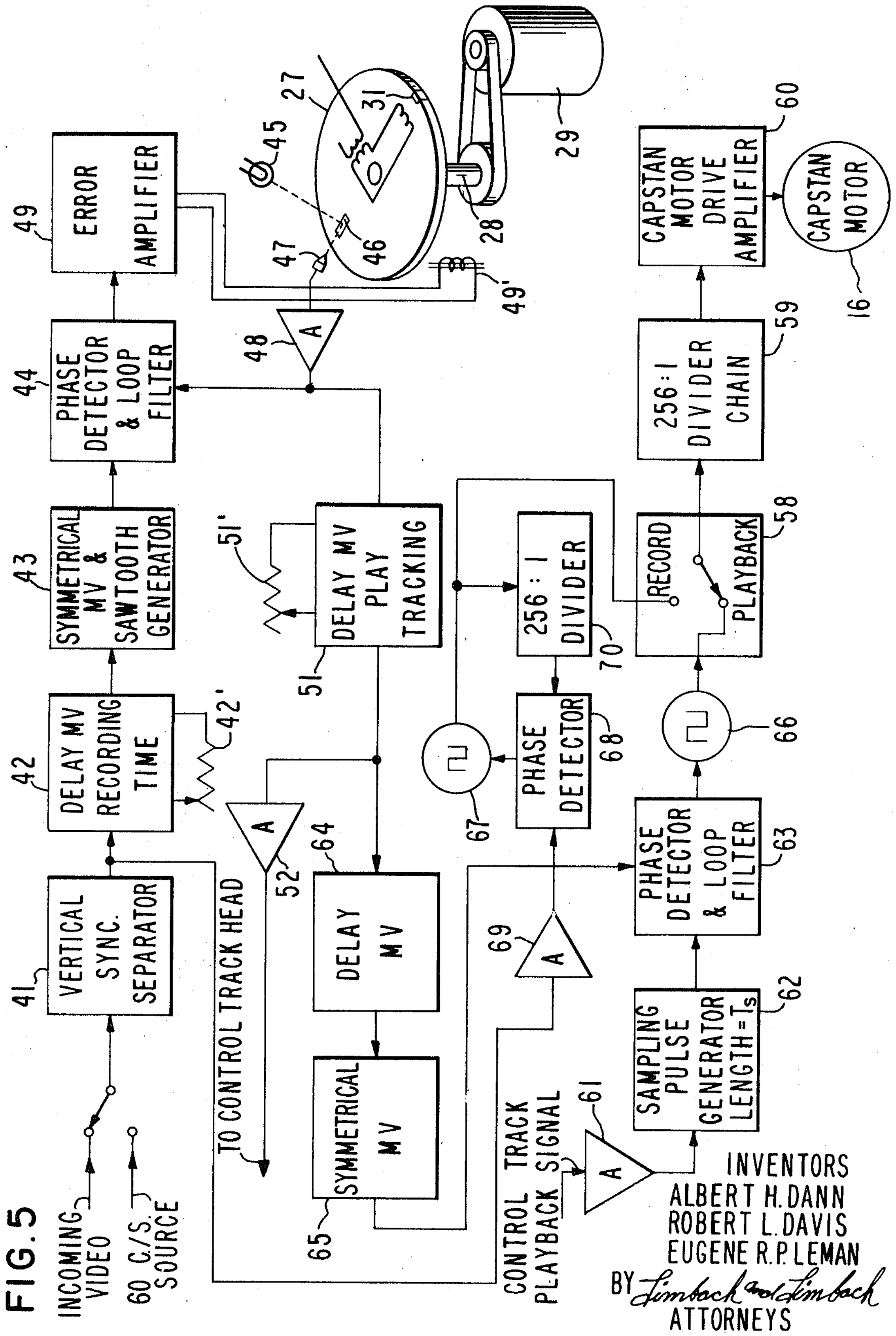
Figure 6:
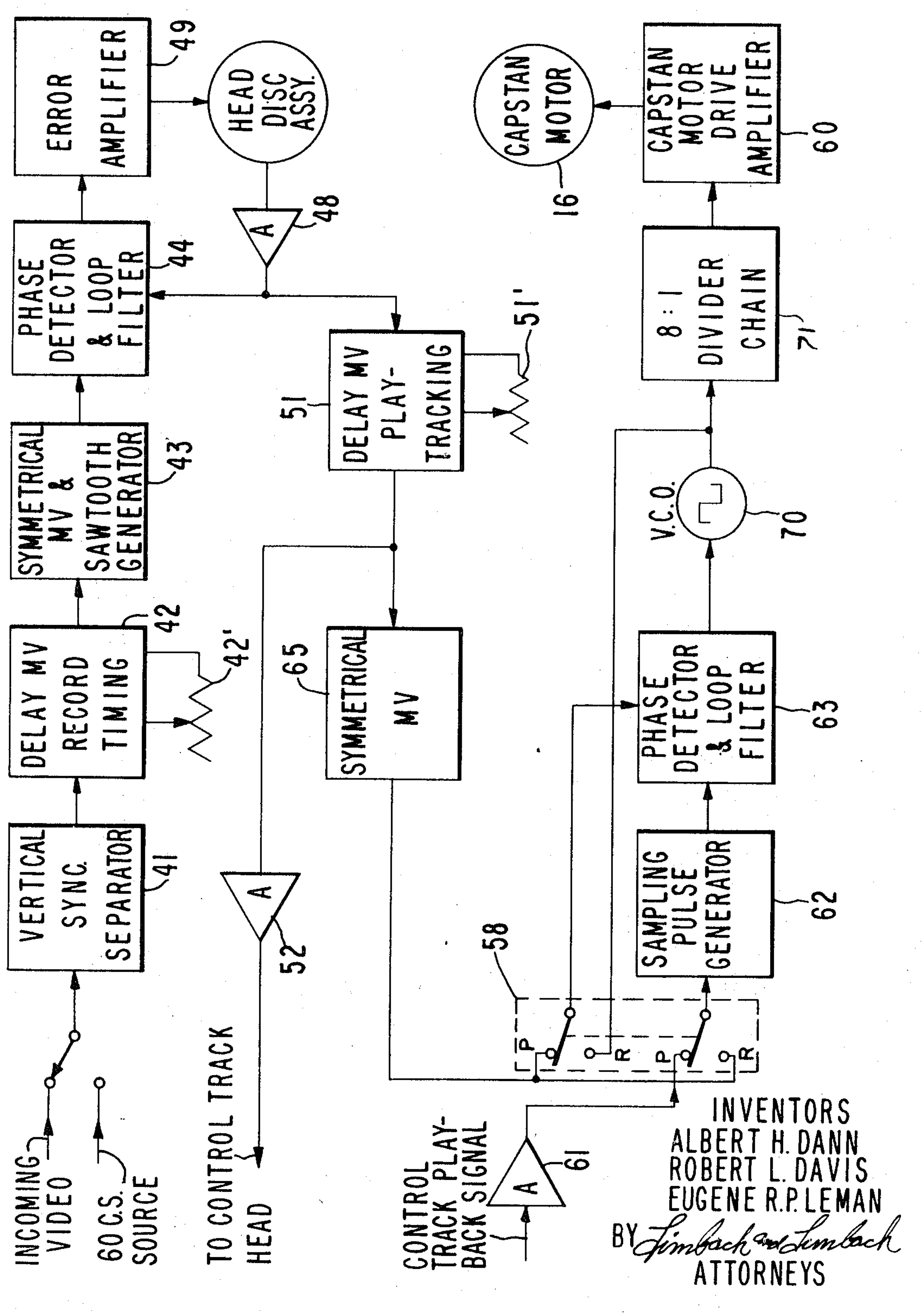

FIG. 4 is a schematic diagram showing the two servo loops utilized in a video recorder made in accordance with the present invention, the servo loops controlling the rotating video recorder head and the tape drive capstan, FIG. 5 is a schematic diagram of another video recorder head and capstan tape drive servo system for accomplishing the purpose of the present invention, and FIG. 6 is a schematic diagram of still another embodiment of the present invention.

Referring now to FIGS. 1, 2, 3, and 4, the helical scan video tape transport of a typical video recorder to which the present invention relates comprises a tape supply reel 11 and supply reel motor 12, takeup reel 13 and takeup reel motor 14, tape drive capstan 15 and capstan drive motor 16, capstan pinch roller 17, tape guide posts 18, erase head 19, audio and control track head 21 and the helical scan drum assembly 22. The scan assembly 22 consists of a tape drum 23 mounted at a slight angle with respect to the vertical, the drum having a lower segment 24 separated from an upper segment 25 by an annular gap 26 sloped slightly relative to the horizontal. A head disk 27 is rotatably mounted within the drum on the drive shaft 28 driven by head drive motor 29, a magnetic record-reproduce video head 31 being secured at one point on the periphery of the disk 27 (see FIG. 4).

The magnetic tape 32 is threaded past the erase, audio and control track heads 19 and 21, respectively, and is wound in one complete loop in a helical manner about the tape drum 23. The upper and lower edges of the tape 32 are placed in abutting relationship at their crossover point at the beginning and ending point of the tape loop. The tape is threaded past a tape tensioning arm 33 and wound on the takeup reel 13. The tape 32 is driven by means of capstan 15 and capstan pinch roller 17 from the left-hand reel 11 to the right-hand reel 13 during record and playback and the head disk 27 and magnetic video head 31 rotate in a counterclockwise direction, the tape 32 and head 31 thus traveling in opposition directions. The tape 32 passes over the gap 26 in the drum 23 while the head rotates rapidly around in the gap 26 and traces a plurality of successive, spaced-apart video tracks 34 on the tape 32 which are sloped at some selected angle determined by the physical characteristics of the tape drive, a typical slope being 4° 45′. During the record mode of operation the system lays down the sloped video tracks 34, an audio track 35 near and parallel to one edge of the tape 32, and a control track consisting of a plurality of spaced-apart control pulses 36 near and parallel to the other edge of the tape. During playback, the speeds of the tape 32 and the head 31 are synchronized by means of the control track signals so that the video head 31 is centered on the successive recorded video tracks 34.

In a typical 60 field video recorder, the video head 31 rotates at a speed of 3,600 revolutions per minute with the tape moving at a longitudinal speed of approximately 7 inches per second. Each rotation of the video head records (or play back) one video field, including the vertical sync pulse.

Helical scan video recorders are well known in the art and are fully described in published material and no further detailed description of the tape transport apparatus will be given here except as the operation of specific portions relate to and are desirable for an understanding of the present invention. In addition, since the video and audio record and reproduce circuitry does not form a part of this invention, details of such well known circuitry will not be provided.

Referring now to FIG. 4 there is shown in schematic diagram form one embodiment of the present invention which provides an accurate video head tracking of the video tracks on the magnetic tape during playback and which provides a synchronization between the magnetic tape speed and the video head rotation while switching from the playback position to the record position during editing functions.

The magnetic head drive motor 29 is synchronized by means of a servo circuit with an incoming video signal during record and edit or with a 60 cycle line signal during playback when no video signal is incoming to the recorder. The incoming video signal is sent to a vertical sync separator circuit 41 which operates to generate pulses from corresponding to and in synchronism with the vertical sync pulses from the incoming video signal. These pulses are transmitted to a delay one-shot multivibrator circuit 42 which operates to synchronize a symmetrical multivibrator and sawtooth generator circuit 43, the output of which is coupled to a phase detector circuit 44 which receives a reference signal from a tachometer pulse generator coupled to the video head 31. The pulse generator comprises a light source 45, a reflector strip 46 secured to the rotating head disk 27 near the periphery thereof, and a photocell pickup 47 for detecting a reflective signal from the reflector strip once during each rotation of the head disk. The pulse detected by the photocell pickup is transmitted through an amplifier circuit 48 to the phase detector 44. The phase detector produces an output signal, the amplitude of which is dependent on the amount that the tachometer pulse is out-of-phase with the vertical sync pulse and the phase of which is dependent upon which direction the two incoming signals are out-of-phase. This error signal is supplied via amplifier 49 to an eddy current brake 49′ at the head disk 27 to adjust the speed of the head disk so that the video recording head 31 passes over the crossover point of the helical tape loop at the exact time that the vertical sync signal is passing through the video head 31 for recording on the magnetic tape. The adjustable record timing control 42′ coupled to the delay multivibrator 42 is used to adjust the phase relationship between the incoming vertical sync pulses and the rotary head 31 to insure that the video head arrives at the edge of the magnetic tape during the vertical interval of the video signal. In this manner the rotational speed of the video head disk is controlled so that the sync signal is recorded on the edge of the tape, the remainder of the single field being recorded on the video track slanted across the magnetic tape. The video head is driven by a hysteresis synchronous motor and is designed to rotate at a speed slightly greater than 3,600 r.p.m., but the servo circuit applies a braking force by means of the eddy brake 49 sufficient to maintain the rotational speed at the correct speed.

The tachometer pulses from the amplifier 48 are also transmitted through a delay multivibrator circuit 51 and through a control track amplifier circuit 52 to the control track head 21 of the tape transport system so that the successive control track pulses are recorded on the video tape in synchronism with the generated tachometer pulses. The control track pulses, rather than being generated by a tachometer coupled to the video-tape-recording head, could be generated directly from the vertical sync pulses received with the incoming video signal.

A second tachometer generator is coupled to the video head drive and consists of disk 53 having 256 openings 54 equally spaced around its perimeter. A light source 55 is positioned so as to direct a beam of light through the openings in succession as they pass, the light beam then impinging upon a photocell pickup 56 and producing 256 equally spaced pulses for each one revolution of the video head. These tachometer pulses are transmitted through an amplifier 57 and through an electronic switch 58 in the "record" position to a 256 to 1 divider chain 59 where they are reduced back to a single pulse for each single rotation of the recorder head. This single pulse per revolution is transmitted to a motor drive amplifier 60 and serves to control the speed of the hysteresis synchronous capstan motor 16 so that the tape is driven at a speed which is in synchronism with the rotational speed of the video recorder head.

During the playback mode of operation, the capstan motor 16 is switched by switch 58 from control by the tachometer pulses from the generator disk 53 to control by the control track pulses recorded on the video tape. The control track pulses, which had been recorded on the video track during recording of the video signals and at the rate of one pulse per revolution of the recording head, are transmitted through an amplifier 61 to a sampling pulse generator 62 where a pulse is generated for each control pulse received. These pulses are transmitted to a phase detector circuit 63 which receives a reference pulse generated from the tachometer generator 45, 46 and 47. This tachometer pulse is transmitted through the multivibrator circuit 51, through a delay multivibrator circuit 64 and a symmetrical multivibrator 65 to the phase detector 63. The signal output from the phase detector 63 controls the frequency output of a voltage-controlled oscillator circuit 66 designed to produce 256 cycles for each video cycle or a total of 256 times 60 cycles or 15,360 cycles per second. The output of the voltage controlled oscillator is transmitted to the 256 to 1 divider chain 59 which reduces the frequency of the signal to 60 pulses per second to control the capstan motor drive amplifier 60. The frequency of the voltage-controlled oscillator 66 is controlled by the output of phase detector 63 to slow down or speed up the tape speed relative to the video head speed so that the video head 31 stays aligned in the center of the video tracks 34 on the tape 32. A tracking control 51′ coupled to the delay multivibrator 51 is used to adjust the phase relationship between the tachometer pulses and the control tracks pulses and thereby permit centering of the video head on the video record tracks during playback.

For ordinary recording and playback operations, it would not be necessary to provide the second tachometer generator 53—57 associated with the recording disk 27 which generates the 256 cycles for each 1 cycle of the recording head nor would it be necessary to supply the 256 to 1 divider circuit 59. A single tachometer pulse per cycle of the video head from generator 45—47 to the capstan motor drive amplifier in the recording mode and a 60 cycle per second voltage-controlled oscillator in the playback mode in lieu of the 15,360 $H_z$ VCO 66 would be satisfactory to provide the desired capstan motor speed control. However, the frequency multiplication is necessary during the editing mode of operation of such video recorders.

In performing editing functions, a video recorder is operated so that the video signal previously recorded on the tape is being played by the recorder and a new video signal which one desires to add into the video tape is being transmitted into the video channel of the recorder. By monitoring the output from the tape on this recorder and simultaneously monitoring the new incoming video signal the two sources are synchronized by the operator and the desired starting point for recording is established. Timers associated with the video recorder and the new source may be used to synchronize the start times. When the exact moment that the addition of the new material on to the existing tape has been reached, the recorder is switched from its playback mode of operation to its record mode. The new video signal and new control track pulses are immediately recorded on the tape directly following the last recorded track on the tape.

In the previous single-pulse system, the output from the voltage controlled oscillator in the capstan drive servo and the tachometer pulse received from the rotating head disk could be out of phase by as much as 180° and in switching the capstan motor drive amplifier from control by the VCO to control by the head disk this phase shift differential would be encountered. Such a phase shift caused the capstan motor to immediately change speed to bring itself back into synchronism with the incoming tachometer pulse and at times resulted in a hunting effect. This momentary shift in speed produces a disruption in black and white video recording, which, although momentary in nature, is disturbing. By utilizing the tachometer multiplier 53—57 and a following divider chain 59, the phase difference is reduced from the previous maximum of 180° to a maximum of 0.7° and such a small phase differential produces a negligible change in the capstan motor speed when switching from the playback mode to the record mode.

The figure of 256 cycles was selected since this provides that a divider circuit 59 of 8 flip-flops may be utilized. It should be understood that a frequency less than or more than 256 cycles may be employed to accomplish the results of the present invention.

Referring now to FIG. 5 there is shown another embodiment of the invention wherein the speed control pulses for the capstan motor 16 are derived from the vertical sync signal of the incoming video signal rather than from tachometer pulses generated by the rotating video head assembly. In this embodiment a voltage controlled oscillator 67 which produces a frequency output of 256 times the video sync frequency is coupled to the output of a phase detector circuit 68 which receives an incoming pulse via amplifier 69 synchronized with the video sync signal. The phase detector 68 also receives an incoming signal from a 256 to 1 divider circuit 70 coupled to the output of the voltage controlled oscillator 67. The frequency of the oscillator 67 is controlled by the output of the phase detector 68 and is transmitted via divider chain 59 to the capstan motor drive amplifier 60 to control the speed of the capstan motor 16 and the tape in synchronism with the vertical sync signal and thus in synchronism with the rotating head disk.

Referring now to FIG. 6 there is shown another form of the present invention wherein, in the playback mode of operation, the control pulses from the sampling pulse generator 62 are compared in the phase detector 63 with a reference pulse received from the video head tachometer by way of the multivibrator 51 and 65. The output of the phase detector 63 controls the frequency of a voltage-controlled oscillator 70 which is set to oscillate at a multiple of the head rotation, for example, a factor of 8 or 480 cycles per second. The output of the VCO 70 is transmittal to a divider circuit 71 to reduce the frequency down to the 60 cycle drive frequency of the capstan drive. When the recorder is switched to the record mode of operation, switch 58 connects the sampling pulse generator 62 to receive the tachometer pulses from the video head circuit and also connects the output of the VCO 70 to the phase detector 63. The sampling pulse from generator 62 may lock to the nearest one of any of the eight pulses from the VCO 70 during the one cycle of the video head.

The frequency multiplication has been limited to eight, for example, to keep the duty cycle of the phase detector within reasonable values. This embodiment is less preferable than the previously described systems since the tachometer and VCO pulses at switchover to the record modes may be as much as 22° out of phase as compared with less than 1° for the other systems.

What I claim is:

1. The method of controlling the magnetic tape speed of a video tape recorder during editing wherein the speed of the magnetic tape drive is controlled by a first series of spaced-apart control pulses from the magnetic video tape during the playback mode of operation, control of the speed of the magnetic tape drive being switched from control by the control pulses to control by a second series of spaced-apart pulses in synchronism with the vertical sync pulses of an incoming video signal during the record mode of operation, the improvement comprising the step of multiplying the frequency of occurrence of the pulses of the first and second series of pulses by substantially the same selected factor.

2. Apparatus for controlling the magnetic tape speed of a video tape recorder during editing comprising first circuit means for controlling the speed of the magnetic tape drive by first series of spaced-apart control pulses from the magnetic video tape during the playback mode of operation, second circuit means for controlling the speed of the magnetic tape drive by a second series of spaced-apart pulses in synchronism with the vertical sync pulses of an incoming video signal during the record mode of operation, and means for switching from said first circuit means to said second circuit means in switching from said playback mode of operation to said record mode of operation, the improvement comprising means in at least said second circuit means for multiplying the frequency of occurrence of the pulses of said first and second series of pulses by substantially the same selected factor.

3. Apparatus as claimed in claim 2 including divider circuit means coupled to the magnetic tape drive for reducing the number of pulses of both series by the same factor that they had been increased.

4. A video tape recorder comprising a rotating head for recording video signals on a magnetic tape during the record mode of operation and for playing back video signals from a magnetic tape during the playback mode of operation, a tape drive circuit for driving the video tape relative to said head, means for driving said head in synchronism with the vertical sync pulse of an incoming video signal and for producing a control pulse on the video tape during the record mode in synchronism with the head rotation, means for deriving a control signal from the rotating head and control pulse on a video tape during the playback mode, first circuit means for coupling said tape drive circuit to said rotating head during the record mode to control the tape speed in response to the speed of rotation of the rotating head, and second circuit means for coupling said tape drive circuit to the control signal deriving means during the playback mode to control the tape speed in response to the rotating head and control pulse, wherein the improvement comprises a multiplier means in said first circuit means for multiplying the frequency of the rotary head a selected factor and a multiplier means in said second circuit means for multiplying the frequency of said control signal by substantially the same selected factor, and a divider means coupled to said tape drive circuit for dividing the frequency of the control signals from said first and second circuit means by said selected factor.

5. The method of recording video signals on a magnetic tape and playing back video signals recorded on the tape comprising the steps, performed during the recording mode of operation, of driving the video head, producing control pulses on the video tape, and controlling the speed of the tape drive motor with a series of control pulses to a tape drive motor control circuit, all in synchronism with the vertical sync pulses from an incoming video signal, and the steps, performed during the playback mode of operation, of producing a control signal from a comparison of tachometer pulses from the video head drive means with the control pulses from the video tape to control the speed of the tape drive motor to align the video track on the video tape with the video head, the improvement comprising the step of multiplying the frequency of the control pulses in said series to the tape drive motor control circuit during the record mode.

6. A video tape recorder comprising a rotating video head for recording video signals on a magnetic tape during the record mode of operation and for playing back video signals from a magnetic tape during the playback mode of operation, a drive motor for driving the video tape relative to said rotating head, a power amplifier circuit for regulating the speed of said tape drive motor, means for driving said video head in synchronism with the vertical sync pulse of an incoming video signal and for producing control signals on the video tape in synchronism with the video head rotation, first circuit means coupled to said rotating video head for producing a series of control pulses in synchronism with the rotating head during the record mode of operation, second circuit means coupled to the control signals on the video tape and to the rotating video head for producing a series of control pulses from the tape during the playback mode of operation, and switch means for coupling the tape drive power amplifier to said first circuit means during the record mode and coupling the tape drive power amplifier to said second circuit means during the playback mode whereby the speed of said tape may be controlled in synchronism with the pulses from said first and second circuit means, the improvement comprising means in said first circuit means for multiplying the frequency of said control pulses by a selected factor relative to the revolutions of said video head and means in said circuit means for multiplying the frequency of said control pulses by substantially the same factor relative to the control signals on the tape, and divider means coupled to said power amplifier for dividing the multiplied series of control pulses by the same factor.

7. A video tape recorder as claimed in claim 6 wherein said means in said first circuit means for multiplying the frequency of said control pulses comprises a voltage-controlled oscillator and wherein said means in said second circuit means for multiplying the frequency of said control pulses comprises a second voltage-controlled oscillator.

8. A video tape recorder as claimed in claim 6 wherein said means in said first circuit means for multiplying the frequency of said control pulses comprises a tachometer coupled to said video head drive motor and wherein said means in said second circuit means for multiplying frequency of said control pulses comprises a voltage-controlled oscillator.

9. A video tape recorder as claimed in claim 8 wherein said second circuit means comprises a phase detector circuit for comparing the pulses from the control signal on the tape with tachometer pulses from the video head, the output of the phase detector controlling the frequency of said voltage-controlled oscillator.

10. Apparatus for reducing phase discontinuities in the tape speed servocontrol of a recorder at the playback to record transition comprising means for deriving a reference signal having a frequency $F_v$, means for deriving a signal from the tape during playback having a frequency of about $F_r$, means receiving said reference signal and tape signal for generating a playback tape speed servocontrol signal in response thereto, said last recited signal having a frequency of at least 8 $F_r$, means for deriving a record tape speed servo control signal having a frequency substantially equal to said playback tape servocontrol signal, and means receiving said playback tape speed servocontrol signal during record for controlling the speed of said tape.

11. Apparatus according to claim 10 wherein said tape speed control means includes means for dividing the frequency of said playback and record tape speed servocontrol signals to provide a tape speed signal having a substantially equal frequency to $F_r$.

12 Apparatus according to claim 11 wherein said playback tape speed servocontrol signal generating means comprises means for comparing the phase of said reference signal and tape signal to provide a phase difference signal in response thereto, and means for generating said playback tape speed servocontrol signal in response to said phase difference signal.

13. Apparatus according to claim 12 wherein said reference signal is derived from the vertical sync pulses of an incoming video signal.

14. Apparatus according to claim 13 wherein said recorder has a rotating record transducer and record tape speed servocontrol signal synchronized with the velocity of said record transducer means.

15. Apparatus according to claim 14 wherein said tape speed control means includes a capstan and capstan drive motor, said drive motor receiving said tape speed signal.

16. Apparatus according to claim 14 wherein said tape derived signal is derived from a control track signal recorded on said tape.

17. Apparatus according to claim 14 wherein said playback tape speed servocontrol signal has a frequency on the order of $256_r$.